United States Patent
Endoh et al.

(10) Patent No.: US 6,596,408 B1
(45) Date of Patent: Jul. 22, 2003

(54) REINFORCING MATERIAL FOR WOOD AND REINFORCED WOOD

(75) Inventors: Yoshihiro Endoh, Shizuoka (JP); Kazunori Taniguchi, Shizuoka (JP); Hiroyasu Ogawa, Tokyo (JP); Shigehisa Ishihara, Nagaokakyo (JP); Isamu Ide, Sakai (JP); Hideo Getto, Aichi (JP); Satoshi Saito, Nagano (JP)

(73) Assignee: Toho Tenax Co., Ltd., Tokyo (JP)

( * ) Notice: Subject to any disclaimer, the term of this patent is extended or adjusted under 35 U.S.C. 154(b) by 0 days.

(21) Appl. No.: 09/762,531

(22) PCT Filed: Aug. 5, 1999

(86) PCT No.: PCT/JP99/04236

§ 371 (c)(1),
(2), (4) Date: Apr. 12, 2001

(87) PCT Pub. No.: WO00/07813

PCT Pub. Date: Feb. 17, 2000

(30) Foreign Application Priority Data

Aug. 7, 1998 (JP) .............................................. 10-224143

(51) Int. Cl.⁷ .............................................. B32B 27/42
(52) U.S. Cl. ...................... 428/524; 428/532; 428/535; 428/536; 428/537.1
(58) Field of Search ................... 428/532, 535, 428/536, 537.1, 524

(56) References Cited

FOREIGN PATENT DOCUMENTS

| EP | 0142906 | * | 5/1985 |
|----|---------|---|--------|
| JP | 53-108182 | | 9/1978 |
| JP | 62-138024 | | 8/1987 |
| JP | 62138024 | * | 8/1987 |
| JP | 3-230904 | | 10/1991 |
| JP | 08 254319 | * | 9/1997 |
| JP | 09-254319 | | 9/1997 |
| JP | 3053837 | | 8/1998 |

* cited by examiner

Primary Examiner—Leszek Kiliman
(74) Attorney, Agent, or Firm—Jordan and Hamburg LLP

(57) ABSTRACT

A phenol resin-impregnated sheet formed by impregnating a porous resin sheet with a phenol resin having a degree of cure of from 70% to 95% is arranged on and laminated to the surface of a carbon fiber-reinforced thermosetting resin sheet. The thickness of the phenol resin impregnated sheet is between 0.01 mm and 1.0 mm. A very even, strong and water-proof wood reinforcing material is obtained. The wood reinforcing material is intergrated and cured on the surface of the wood material by the phenol resin-impregnated sheet to reinforce wood material (single board or bonded board) to form a reinforced wood material. The wood reinforcing material adheres suitably with the wood material and does not cause environmental contamination.

7 Claims, 2 Drawing Sheets

REINFORCING MATERIAL FOR WOOD AND REINFORCED WOOD

FIELD OF THE INVENTION

This invention relates a wood reinforcing material for strengthening wood material and a reinforced wood material reinforced with the wood reinforcing material.

BACKGROUND OF THE INVENTION

Heretofore, single wood materials or so-called bonded wood materials formed by bonding sawn woods or small square lumbers cut longitudinally in the direction of fibers with the direction of the fibers being in parallel with each other have been used mainly as frame materials such as post and beams in buildings, as well as for wooden bridges or large scale domes.

Particularly, since the bonded wood materials are assembled from sawn woods and small square lumbers, they have excellent characteristics such as high degree of freedom for the size and dimension, less variation in the strength of products, cracks or errors cause by drying, as well as capable of easily manufacturing bent materials.

However, when such bonded wood materials are used for large buildings and structures, since the rigidity and strength of the bonded materials have to be increased, it is necessary to increase the thickness for the bonded materials and, as a result, this causes problems such as lowering of ceilings in the buildings and structures, or.unnecessary increase in the height of roofs.

Therefore, for providing the bonded wood materials and single wood materials with high rigidity and strength and also providing sufficient water proofness, corrosion resistance, fire resistance, heat resistance and adhesion required for the buildings or structures of woods, it has been proposed to bond carbon fibers by adhesives such as phenolic resins or resorcinolic resins to obtain reinforced wood materials such as carbon fiber-reinforced single wood materials or carbon fiber-reinforced bonded wood materials.

As one of methods for manufacturing such reinforced wood materials, Japanese Laid-Open No. 230904/1991, for instance, discloses a method of coating an adhesive on the surface of wood material, disposing carbon fibers thereon and impregnating an adhesive between the fibers and also bonding the same with the wood material (Prior Art 1).

As another method of manufacturing the carbon fiber-reinforced single wood material or carbon fiber-reinforced bonded wood material, Japanese Patent Laid-Open No. 108182/1978 proposes a method of using a so-called prepreg in which an adhesive is previously impregnated sufficiently to carbon fibers and bonding the same to a wood material (Prior Art 2). This method enables working in various places and is suitable also in view of the fabricability and, accordingly, has been used generally.

The present inventors have proposed a wood reinforcing material by bonding a wood reinforcing carbon fiber prepreg and a wooden sheet in Japanese Patent Laid-Open No. 254319/1997 (Prior Art 3). In this cited invention, release paper is not necessary, the resultant wood reinforcing material has high strength and high rigidity and can obtain high stable properties regarding adhesion performance between the wooden sheet and the wood material, or adhesion performance between the wooden sheet and carbon fibers.

In the Prior Arts 1 and 2, since the wood material is natural products having different natures depending on the growing environments, it involves a problem that adhesion fluctuates when the carbon fiber prepreg and the wood material are bonded. Further, for ensuring the bondability, it requires a frequent control for selecting and optimizing the state such as solid, semi-solid or liquid and amount thereof, which leaves various problems with view point of cost performance and quality.

In the Prior Art 2 described above, since carbon fiber prepregs are generally transported or stored being rolled or stacked into sheets, so that release paper is disposed on one surface or both surfaces of the prepreg. However, when bonding with the wood materials, troublesome and time consuming fabrication operations are necessary such as for removal of the release paper, as well as removed release paper yields wastes and the use of prepregs have resulted in environmental contamination.

In the Prior Art 3 described above, the wooden sheet itself causes shear failure in the bending failure test and sufficient reinforcing effect can not always be obtained.

The present inventors have intended to provide a wood reinforcing material which is applied to wood materials or bonded wood materials for reinforcement capable of overcoming the problems in the prior art, as well as a reinforced wood material in which the wood reinforcing material is applied to the surface of the wood material or to the inner layer of the bonded wood material.

Specifically, this invention intends to provide a wood reinforcing material excellent in bondability with the wood material and handlability, not causing environmental contamination such as forming wastes of release paper, and having a sufficient reinforcing effect for the wood material, as well as reinforced wood material.

More specifically, this invention intends to provide a wood reinforcing material of reducing fluctuation of adhesion performance, strength and rigidity caused by variation in wood materials as natural products and minimizing the complexity in view of the working and minimizing the wastes, as well as having high bondability, strength and rigidity, as well as a reinforced wood material applied with the wood reinforcing material.

SUMMARY OF THE INVENTION

It is an object of the present invention to solve the foregoing problems.

In accordance with a wood reinforcing material of this invention, a phenol resin-impregnated sheet with a degree of cure of 70% or more and 95% or less in which a porous sheet is impregnated with a phenol resin is disposed on the surface of a carbon fiber-reinforced thermosetting resin sheet.

Further, in accordance with a reinforced wood material of the invention, the wood reinforcing material is integrated and cured by way of a phenol resin-impregnated sheet on the surface of a wood material.

In the wood reinforcing material of the invention, since a phenolic resin-impregnated sheet with a degree of cure of 70% or more and 95% or less is disposed, it forms a molding product showing excellent adhesion to a wood material to be reinforced and also free from stickiness, so that it does not require release paper. Accordingly, the reinforced wood material according to this invention which is reinforced by applying the wood reinforcing material of the invention to the surface of the wood material has a feature of high strength, high rigidity and high shear strength.

Carbon Fiber-reinforced Thermosetting Resin Sheet

A carbon fiber-reinforced thermosetting resin sheet as a constituent factor of the wood reinforcing material of this invention is reinforced with carbon fiber in the thermosetting resin as reinforcing fibers.

There is no particular restriction on the carbon fibers and carbon fibers obtained from polyacrylonitrile fibers with a nitrogen content of 0.1 to 15% by weight, a tensile strength of 2,500 to 7,000 MPa and a modulus of elasticity of 150–700 GPa are preferred and, particularly, carbon fibers of 5 to 9 mm diameter containing 3 to 10% of a nitrogen content and having 3,500 MPa or more of tensile strength and 200 to 350 GPa of modulus of elasticity are preferred in view of the adhesion.

Further, those in which the oxygen/carbon ratio of 0.01/1 to 0.3/1, particularly, 0.01/1 to 0.25/1 at the surface of the carbon fibers of this invention by an ESCA surface analyzer (manufactured by Shimazu Seisakusho) are preferred since the adhesion strength can be improved.

It is desired that carbon fibers with the fiber diameter of from 5 to 9 mm and fiber strands comprising the fibers by the number of 1,000 to 300,000 are used by being bundled or spread in a sheet-like shape in an amount, with no particular restriction only thereto.

The form of the carbon fiber may be a multi-directional sheet such as woven or non-woven fabrics or linear materials such as uni-directionally oriented sheets or rovings.

Kinds of the thermosetting resins reinforced with carbon fibers have no particular restrictions and, in view of use for buildings, one or more member selected from isocyanate type resins or resorsinol resins, or resol type phenolic resins are preferred, formaldehydes are preferred as the curing agent for the thermosetting resin and inorganic acids or organic acids are preferred for curing catalysts.

Referring more specifically to the thermosetting resins, known resol type phenol resins (phenol formaldehyde initial polycondensation resins) and resorcinol resins obtained by methyloling phenols having a phenol hydroxy group such as phenol, cresol, xylenol, ethylphenol, chlorophenol and bromophenol or phenols having two or more phenolic hydroxy groups such as oligomer, and resorcin, hydroquinone, catechol and fluoroglycinol, and aldehydes such as formaldehyde, para-formaldehyde, acetoaldehyde, fulfural, benzaldehyde, trioxane and tetraoxane, at a molar ratio of phenols/aldehydes=2/1 to 1/3, preferably, 5/4 to 2/5, under the presence of an alkali catalyst such as potassium hydroxide or sodium hydroxide can be used.

More preferably, resins having an average molecular weight as polystyrene of 120 to 2000, and, particularly, 150 to 500 according to high speed liquid chromatography (HPLC) are preferred and those resins having viscosity adjusted to 3 to 150 poise at 25-C are preferred.

Among known curing agents used for resorcinol resins and resol type phenol resins curing agents which become paste or liquid when mixed with the resins such as formaldehyde, acetoaldehyde, furfural or trioxane are preferred.

Curing catalysts which are dissolved into liquid form when mixed with resins such as para-toluene sulfonic acid, benzene sulfonic acid, xylene sulfonic acid and phenol sulfonic acid are preferred.

In view of the production process of the carbon fiber-reinforced thermosetting resin sheets, curing agents or curing catalysts which form homogeneous liquid at 35-C or lower as a temperature for usual production of prepregs when prepared as mixed resins for uniformly curing the prepregs are preferred.

In the fiber reinforcing material of this invention, the carbon fiber-reinforced thermosetting resin sheet as a constituent factor may be a prepreg sheet or a completely cured sheet. It is preferred that the sheet is completely cured with an aim of increasing the strength of the carbon fiber-strengthened resin composite material per se.

Phenol Resin-impregnated Sheet

The phenol resin impregnated sheet as a constituent factor of the wood reinforcing material of this invention is a sheet formed by impregnating a porous sheet with a phenol resin, for improving the adhesion strength when the wood reinforcing material is bonded by an adhesive on the surface of wood material. Accordingly, it is important that the sheet has thin and uniform thickness.

The thickness of the phenol resin-impregnated sheet is preferably 0.01 mm or more and 1.0 mm or less. If the thickness is less than 0.01 mm, the sheet performance is deteriorated by unevenness caused to the form of the phenol resin-impregnated sheet and, depending on the case, curling in the lateral direction and, in addition, the strength of the sheet is lowered to allow easy tearing by an external force or result in difficulty in the handlability. On the other hand, if the thickness is more than 1.0 mm, the water proofness or shear strength is sometimes lowered.

The porous sheet can include, regarding the form, for example, non-woven fabric, paper and wooden fabric and can include, regarding material, for example, pulp, glass fiber and carbon fiber and synthetic fiber.

The resin impregnating in the phenol resin-impregnated sheet used in this invention is a highly viscous or solid resin such as a phenolic resin or phenol/melamine resin mixture, with no restriction for the presence or absence of the curing agent, and use of a less reactive resin capable of controlling the degree of cure is preferred for attaining the purpose of this invention.

The phenol resin is used because this is excellent in fire proof and heat resistant performance and, further, excellent in water proofness, corrosion resistance and bondability and, thus, this can be used suitably to building materials.

Actual examples of such phenol resins are phenols having one phenolic hydroxy group such as phenol, cresol, xylenol, ethylphenol, chlorophenol and bromophenol or phenols having two or more phenolic hydroxy groups such as oligomer and resorcine, hydroquinone, catechol and fluoroglycinol and, further, resins formed by mixing one or more of resins such as melamine, epoxy, and unsaturated esters with the resins mentioned above.

In the wood reinforcing material of this invention, it is preferred that the degree of cure of the phenol resin in the phenol resin-impregnated sheet as the constituent factor is controlled to 70% or more and 95% or less, preferably, 75% or more and 90% or less, in order to keep favorable adhesion and shear strength. That is, if the degree of the cure of the resin is less than 70%, peeling occurs in the phenol resin-impregnated sheet because of the low degree of the cure of the phenol resin and, on the other hand, if it exceeds 95%, curing proceeds excessively and reactivity with the adhesive is lowered to result in peeling at the boundary with the wood material.

Further, when the degree of cure of the resin in the phenol resin-impregnated sheet is controlled to 70% or more and 95% or less, the wood reinforcing material of this invention forms a molding product with no stickiness thus making it unnecessary for the use of release paper which is indispensable for usual prepregs during storage or transportation.

The degree of cure is measured as follows.

① For identical phenol resin-impregnated sheets, an uncured phenol resin-impregnated sheet and an optionally cured phenol resin-impregnated sheet are dried each by 100 $cm^2$ in a desiccator containing a silica gel at a normal temperature for 30 min. under a reduced pressure and then further dried in a pressure reduced state for 15 hrs. The weight for the uncured phenol resin-impregnated sheet and the optionally cured phenol resin-impregnated sheet in this case is defined as WO, WO', respectively.

② Each of the uncured phenol resin-impregnated sheet and the optionally cured phenol resin-impregnated sheet in above ① is extracted for five hours with the solvent for the phenol resin-impregnated sheet such as acetone using a Soxhlet extractor, dried in a desiccator containing silica gel at a normal temperature for 2 hours under a reduced pressure and, further, dried for 15 hrs in a pressure reduced state. The weight for the uncured phenol resin-impregnated sheet and the optionally cured phenol resin-impregnated sheet in this case is defined as W1, W1', respectively.

③ Degree of cure is calculated based on and described above ① and ② in accordance with the following equation 1.

$$\text{Degree of cure } (\%) = (1-(W0'-S1')/(W0-W1)) \times 100 \quad \text{formula (1)}$$

Composite Structure of Wood Reinforcing Material

The carbon fiber-reinforced thermosetting resin sheet and the phenol resin-impregnated sheet can take the following composite structures (1) and (2).
Composite Structure (1):
A composite structure in which the carbon fiber reinforced thermosetting resin sheet and the phenol resin-impregnated sheet are entirely bonded and integrated.
Composite Structure (2):
A composite structure in which the carbon fiber-reinforced thermosetting resin sheet and the phenol resin-impregnated sheet are point-bonded and integrated.

Such composite structures (1) and (2) can be obtained by the following manufacturing method.
Manufacturing Method:
A phenol resin-impregnated sheet is appended on one surface or both surfaces of a so-called prepreg sheet formed by impregnating carbon fibers with a thermosetting resin for wood reinforcement, and then integrating them by using a hot press or the like such that the degree of cure of the phenol resin-impregnated sheet is 70% or more and 95% or less. The thermosetting resin for the carbon fibers in this case may not always be cured completely.

Reinforced Wood Material

The reinforced wood material in this invention can include single wood materials or bonded wood materials and there are no particular restrictions so long as they are existent wood materials and, usually, wood materials used for building such as cedar, hinoki cypress, larch, Pseudotsuga taxifolia Britt and peel of Citrus aurantium and wood material used for plywoods such as Japanese oak, paulownia, zelkova, maple, horse chestnut, Magnolia obovata Thumb, cherry, teak, lauan and SPINAL can be used.

Reinforcement of Wood Material

Wood reinforcing material of this invention (carbon fiber reinforced resin composite material) is used for wood reinforcement as shown below.

The wood reinforcing material of this invention is appended on the surface of a single wood material or to the surface of the single board or any one of board, or between single boards or the surface of a bonded material comprising a plurality of boards or single board and integrated and cured into a reinforced wood material, optionally, with the interposition of adhesives or further necessary, under heating and under pressure.

BRIEF DESCRIPTION OF THE DRAWINGS

In FIG. 1, in the wood reinforcing material (carbon fiber-reinforced resin composite material) of this invention, a phenol resin-impregnated sheet 1 is disposed on both surfaces of a carbon fiber-reinforced thermosetting resin sheet 2.

DETAILED DESCRIPTION OF THE INVENTION

Figure 1:
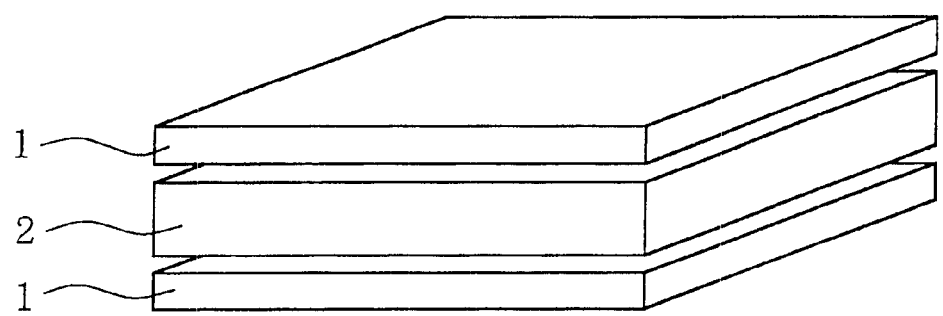
FIG. 1 illustrates an example of a wood reinforcing material of this invention which is shown being decomposed on every constituent factors.
Figure 2:
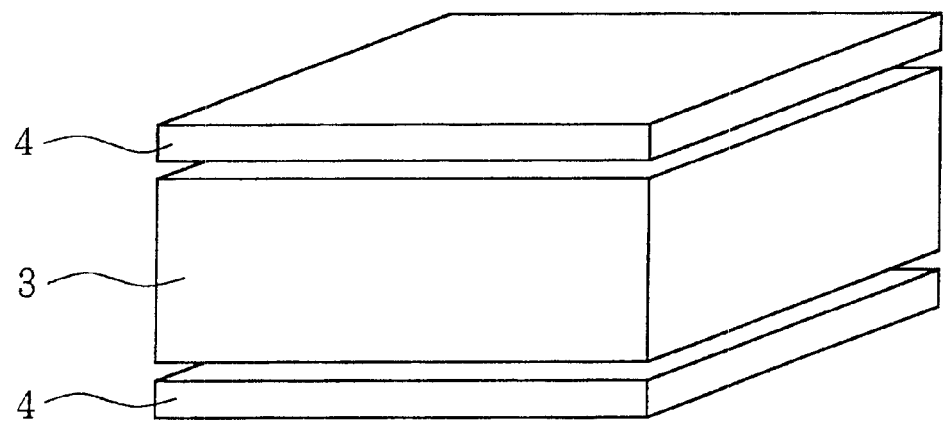
FIG. 2 illustrates an example of a wood reinforcing material of this invention which is shown being decomposed on every constituent factors. In the reinforced wood material in FIG. 2, a wood reinforcing material 4 of this invention is disposed for reinforcement on both surfaces of a single wood material 3. Although not shown particularly in FIG. 2, an adhesive resin is usually present between the single wood material 3 and the wood reinforcing material 4.
Figure 3:
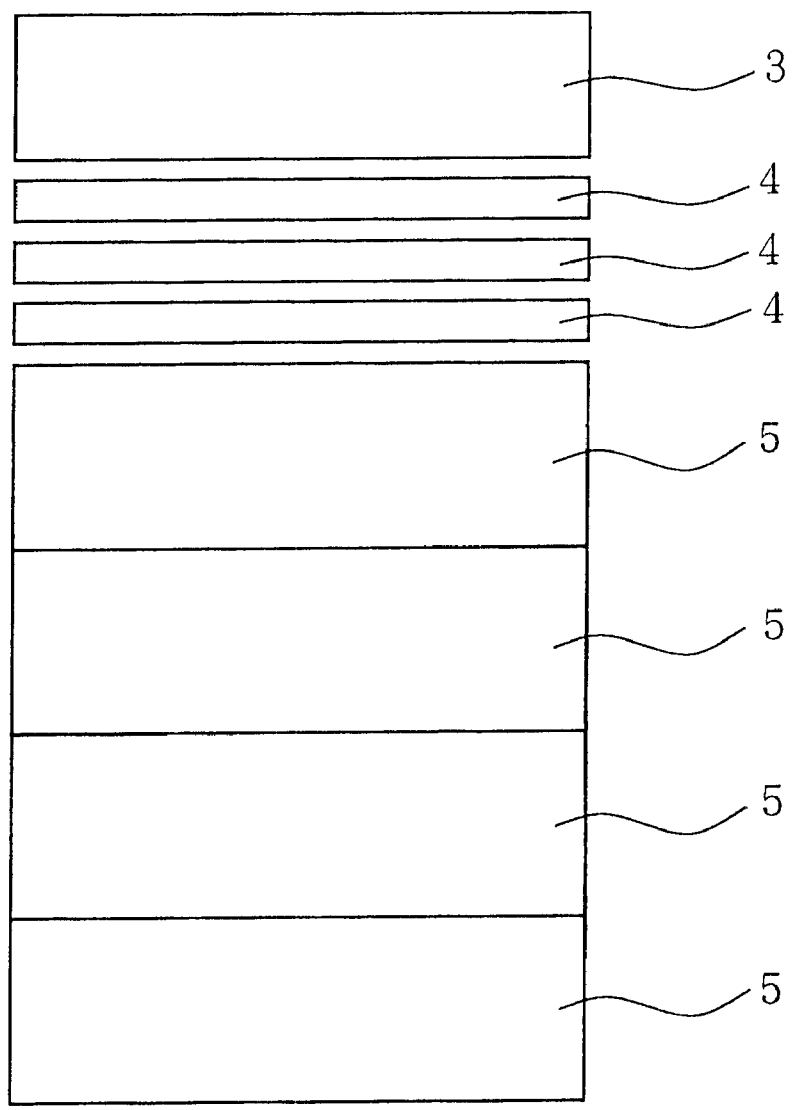
FIG. 3 is a cross sectional view for an example of a reinforced wood material in which bonded material is reinforced by using the wood reinforcing material of this invention. In the reinforced wood material in FIG. 3, a wood reinforcing material 4 comprising a plurality of layers is disposed on a bonded material 5 laminated in a plurality of layers and, further, a single wood material 3 is disposed on the wood reinforcing material 4. Although not particularly illustrated in FIG. 3, an adhesive layer is usually interposed between the single wood material 3 and the wood reinforcing material 4, between the wood reinforcing material 4 and the wood reinforcing material 4, between the wood reinforcing material 4 and the bonded material 5 or between the bonded material 5 and the BONDED material 5.

The wood reinforcing material of this invention will described more specifically with reference to the accompanying drawings.

The wood reinforcing material of this invention can be manufactured, for example, as shown below.

It is manufactured by dipping strands of carbon fibers continuously in a liquid resin mixture formed by mixing one or more of thermosetting resins, a curing agent or a curing catalyst and, optionally, an inorganic filler such that the resin mixture is 30 to 80% by weight based on the carbon fibers, drying evaporative contents, if necessary, then winding the fibers so as to be in parallel with each other on a phenol resin-impregnated sheet previously wound around a drum, drying optionally and cutting the same in the lateral direction of the drum, or manufactured by a method of impregnating a resin into fibers while arranging carbon fiber strands on a phenol resin-impregnated sheet in which the resin is previously coated while pressing by a roll on the surface in parallel with each other.

It is preferred that the resin mixture is a homogeneous solution for uniformly impregnating the carbon fibers and conducting curing uniformly. If it is not uniform, the resultant carbon fiber-reinforced thermosetting resin sheet (prepreg) causes curing failure, or the adhesion is lowered, which is not preferred.

Further, when the amount of the resin mixture of the carbon fiber-reinforced thermosetting resin sheet impregnated with the resin mixture is 30% by weight or less, not only the strength property is not developed but also the bondability with the phenol resin-impregnated sheet is poor because of the insufficiency of the amount of the resin. On the other hand, when the amount of the resin mixture in the carbon fiber-reinforced thermosetting resin sheet is more than 80% by weight, the strength property is not developed which that the carbon fibers are disturbed being caused by the resin flow during molding, as well as difficulty is caused to the handlability such as drop of the resin from the carbon fiber-reinforced thermosetting resin sheet because of excessive amount, which is not preferred.

Particularly, it is preferred when the amount of the resin mixture in the carbon fiber-reinforced thermosetting resin sheet is from 40 to 60% by weight, since the strength property, bondability with the phenol resin-impregnated sheet or handlability of the carbon fiber-reinforced thermosetting resin sheet are favorable.

Further, the viscosity of the resin mixture at 25-C is preferably from 3 to 150 poise. If the viscosity is 3 poise or less, the resin tends to drop from the prepreg and, on the other hand, if it is 150 poise or more, impregnation of the resin into the carbon fibers is deteriorated, which is not preferred.

The viscosity can be controlled with addition of water or alcohol.

The wood reinforcing material of this invention can be manufactured by appending a phenol resin-impregnated sheet to a carbon fiber-reinforced thermosetting resin sheet, pressurizing them and, optionally, heating them into integration. The degree of cure of the phenol resin-impregnated sheet in this case is controlled 70% or more and 95% or less, which may be controlled by heating for once or heating for twice or more during preparation, or by culture at normal temperature.

The wood reinforcing material of this invention and a single wood material and a bonded wood material are bonded and integrated as shown below.

That is, an existent wood adhesive, if necessary, the resin formed by mixing the resin and an inorganic acid or an organic acid as a curing agent or curing catalyst used in this invention, a resin mixture used for the carbon fiber prepreg can be coated to the surface of the single wood material or the bonded wood material, and the surface of the thin board of the bonded wood. After coating the resin to the wood surface, the wood reinforcing material is appended such that the direction of the carbon fibers is parallel with the fiber direction of the wood and, in a case where the reinforced wood material is a thin board for bonded wood material, the wood reinforcing material and other several thin boards for bonded wood material are laminated by way of an adhesive by a known method and then heated under a pressure of 1 to 15 kg/cm$^2$ at a temperature of normal temperature to 120-C for 5 to 24 hours to obtain the reinforced wood of this invention.

This invention is to be explained concretely by way of examples but the invention is not restricted to the following examples unless it exceeds the scope thereof.

The viscosity of the resin for use in the carbon fiber resin composite material was measured and determined by using a rheology physical property tester (manufactured by Rheology Co.).

Further, bending test and bondability test (cole test, boiled test and block shearing test) for wood material, bonded wood material and carbon fiber reinforced wood material and bonded wood material thereof were conducted in accordance with Agricultural and Forest Standards of Japan for structural bonded wood material. The cold test and the boiled test were conducted in application circumstance 1.

EXAMPLE 1

Strands of carbon fibers "BESFITE (registered trade name) HTA12K" (manufactured by Toho Rayon Co.) having fiber characteristics of a single fiber diameter of 7 mm, total number of fibers of 12,000, a tensile strength of 3,890 MPa and a tensile modulus of elasticity of 236 GPa were passed through a resin bath containing a resin mixture obtained by uniformly mixing and dissolving 82 parts of resol type phenol resin "AH-343" (manufactured by Lignite Co.) having a viscosity at 20-C of 35 poise and 18 parts of an organic curing agent mainly comprising para-toluene sulfonic acid "D-5" (manufactured by Lignite Co.) by 5 mm/min, at a room temperature and for a dip time of 0.5 min., and wound around a drum of 127 cm diameter to a width of 100 cm such that the strands were in parallel while controlling by a squeeze roll such that the resin content was 55% by weight to form a carbon fiber-reinforced thermosetting resin sheet of 100 cm width and about 4.0 m length, with the total carbon fiber weight of 150 g/M$^2$.

After cutting the carbon fiber-reinforced thermosetting resin sheet to a rectangular shape of 100 mm width and 250 mm length and laminating them by two layers, a phenol resin-impregnated sheet of 0.25 mm thickness (trade name of products: phenol resin-impregnated sheet PFP2, manufactured by Lignite Co.) was appended on both surfaces and heat cured to be integrated under a pressure of 5 kg/cm$^2$ at a temperature of 100-C for a retention time of 3 hrs to form a flat board of a wood reinforcing material of this Example 1 (a carbon fiber reinforced resin composite material). The carbon fiber content in the wood reinforcing material is 50% by volume and the degree of cure for the phenol resin-impregnated sheet is 80%.

A single cedar board of 60 mm width, 75 mm length and 10 mm thickness was bonded to both surfaces of the flat board of the wood reinforcing material of 60 mm width and 75 mm length cut out of the flat wood reinforcing material by using a resin formed by mixing 85 parts of resorcinol resin D300 (trade name) and 15 parts of para-formaldehyde H30M (trade name), the curing agent therefor manufactured by Ohkashinko Co., to prepare the reinforced wood material of this Example 1.

Cold test, boiled test and block shearing test were conducted for the thus obtained reinforced wood material as the specimen.

Further, in the same manner as in the method described above, rectangular flat boards of wood reinforcing material of 30 mm width, 500 mm length and 45 mm width and 2 m length were prepared in the same manner as described above. They were bonded to a cedar board of 30 mm width, 500 mm length and 25 mm thickness and a bonded wood material formed by laminating four cedar layers each of 45 mm width, 2 m length and 25 mm thickness respectively using the resin consists of the above-mentioned D300 and H30M and bending strength was measured.

The results are shown in the following Table 1. The reinforced wood material formed by integrating the wood reinforcing material of Example 1 and the wood material had excellent adhesion performance and strength characteristic capable of satisfying Agriculture and Forestry Standard of Japan.

COMPARATIVE EXAMPLE 1

A wood reinforcing material (FRP) was prepared in the same manner as in Example 1 by using the carbon fiber-reinforced thermosetting resin sheet manufactured in the same manner as in Example 1 except for laminating the sheet by two layers and not appending the phenol resin-impregnated sheet thereto. This was bonded and integrated with the wood material (cedar) in the same manner as in Example 1 to obtain a reinforced wood material of Comparative Example 1, to which adhesion test and bending test were conducted. The results are shown in the following Table 1. This did not satisfy the adhesion test according to Agriculture and Forestry Standards of Japan and the bending strength showed no satisfactory value although improved somewhat.

COMPARATIVE EXAMPLE 2

A wood reinforcing material was prepared by using the carbon fiber-reinforced thermosetting resin sheet prepared in the same manner as in Example 1 except for laminating the sheet by two layers and appending a wooden sheet (spruce)

instead of the phenol resin-impregnated sheet. This was bonded and integrated with the wood material (cedar) in the same manner as in Example 1 to prepare a reinforced wood material, to which adhesion test and bending test were conducted. The results are shown in the following Table 1. Although this satisfied the adhesion test according to Agriculture and Forestry Standards of Japan but shear fracture was caused in the spruce in the bending test and no sufficient value was obtained for the improvement of the bending strength.

to 110-C upon manufacture of the wood reinforcing material in Example 1, and an adhesion test was conducted. The results are shown in the following Table 2.

The degree of cure of the phenol resin-impregnated sheet of the wood reinforcing material in Example 3 was 90%, which showed adhesion performance satisfying the Agriculture and Forestry Standards of Japan.

Comparative Example 3

A test specimen was prepared in the same manner as in Example 1 except for changing the fabrication temperature

TABLE 1

| Item | Not-reinforced | Example 1 | Comparetive Example 1 | Comparative Example 2 |
|---|---|---|---|---|
| Molding material | | | | |
| Surface material | None | Phenol resin-impregnated sheet | FRP sheet | Spruce sheet |
| Thickness | — | 0.25 mm | — | 0.45 mm |
| Degree of cure | — | 80% | — | — |
| Material in FRP | None | CF/phenol | CF/phenol | CF/phenol |
| Form of fiber | None | Umidirectional | Umidirectional | Umidirectional |
| CF amount 2 m bending test | None | 300 g/m$^2$ × 4 layer | 300 g/m$^2$ × 4 layer | 300 g/m$^2$ × 4 layer |
| Other test | None | 150 g/m$^2$ × 2 layer | 150 g/m$^2$ × 2 layer | 150 g/m$^2$ × 2 layer |
| Bonded material | Cedar | Cedar | Cedar | Cedar |
| Adhesive | Phenol resin | Phenol resin | Phenol resin | Phenol resin |
| Boiled test Delamination (%) | | | | |
| 1st | 0 | 0 | 32 | 0 |
| 2nd | 0 | 0 | 69 | 0 |
| Main Delamination form | None | None | Between wood sheet | None |
| Cold test Delamination (%) | | | | |
| 1st | 0 | 0 | 15 | 0 |
| 2nd | 0 | 0 | 26 | 0 |
| Main Delamination form | None | None | Between wood sheet | None |
| Block shearing test | | | | |
| Shear strength | 98 kgf/cm$^2$ | 112 kgf/cm$^2$ | 92 kgf/cm$^2$ | 102 kfg/cm$^2$ |
| Wood failure rate | 100% | 88% | 46% | 5% |
| Failure form | Wood broken | Wood broken | Between wood sheet | Spruce shear |
| 50 cm bending test | | | | |
| Bending strength | 742 kgf/cm$^2$ | 1430 kgf/cm$^2$ | 1270 kgf/cm$^2$ | 1230 kgf/cm$^2$ |
| Failure form | Wood broken | Wood broken | Between wood sheet | Spruce shear |
| 2 m bend test | | | | |
| Bending strength | 283 kgf/cm$^2$ | 763 kgf/cm$^2$ | 442 kgf/cm$^2$ | 397 kgf/cm$^2$ |
| Failure form | Wood broken | Wood broken | Between wood sheet | Spruce shear |

EXAMPLE 2

A test specimen was prepared in the same manner as in Example 1 except for changing the fabrication temperature to 90-C upon manufacture of the wood reinforcing material in Example 1, and adhesion test was conducted. The results are shown in the following Table 2.

The degree of cure of the phenol resin-impregnated sheet of the wood reinforcing material in Example 2 was 75%, which showed adhesion performance satisfying the Agriculture and Forestry Standards of Japan.

EXAMPLE 3

A test specimen was prepared in the same manner as in Example 1 except for changing the fabrication temperature to 80-C upon manufacture of the carbon fiber-reinforced thermosetting resin sheet in Example 1, and adhesion test was conducted. The results are shown in the following Table 2.

The degree of cure of the phenol resin-impregnated sheet of the wood reinforcing material in Comparative Example 3 was 50%, which showed adhesion performance not satisfying the Agriculture and Forestry Standards of Japan.

COMPARATIVE EXAMPLE 4

A test specimen was prepared in the same manner as in Example 1 except for changing the fabrication temperature to 150-C upon manufacture of the carbon fiber-reinforced thermosetting resin sheet in Example 1, and an adhesion test was conducted. The results are shown in the following Table 2.

The degree of cure of the phenol resin-impregnated sheet of the wood reinforcing material in Comparative Example 4 was 99% or more, which showed adhesion performance not satisfying the Agriculture and Forestry Standards of Japan.

Further, even wood materials not usable so far because of low strength of low rigidity can be employed, which can lead to effective utilization of various resources and are useful in view of environmental preservation.

Furthermore, this can extend the application uses of wood materials to large scale buildings and structures not possible so far, as well as can reduce the amount of natural wood materials used.

TABLE 2

| Item | Example 2 | Example 3 | Comparative Example 3 | Comparative Example 4 |
|---|---|---|---|---|
| Molding material |  |  |  |  |
| Surface material |  |  |  |  |
| Material | Phenol resin-impregnated sheet | Phenol resin-impregnated sheet | Phenol resin-impregnated sheet | Phenol resin-impregnated sheet |
| Thickness | 0.25 mm | 0.25 mm | 0.25 mm | 0.25 mm |
| Degree of cure | 75% | 90% | 50% | 99% |
| FRP sheet |  |  |  |  |
| Material | CF/phenol | CF/phenol | CF/phenol | CF/phenol |
| CF form | Unidirectional | Unidirectional | Unidirectional | Unidirectional |
| Bonded material | Cedar | Cedar | Cedar | Cedar |
| Wood sheet adhesive | Phenol resin | Phenol resin | Phenol resin | Phenol resin |
| Boiled test |  |  |  |  |
| Delamination (%) |  |  |  |  |
| $1^{st}$ | 0 | 0 | 5 | 100 |
| $2^{nd}$ | 0 | 0 | 7 | 100 |
| Delamination form | None | None | In impregnated sheet | Between wood sheets |
| Cold test |  |  |  |  |
| Delamination (%) |  |  |  |  |
| $1^{st}$ | 0 | 0 | 0 | 15 |
| $2^{nd}$ | 0 | 0 | 3 | 32 |
| Delamination form | None | None | In impregnated sheet | Between wood material |
| Block shearing test |  |  |  |  |
| Shear strength | 110 kgf/cm$^2$ | 109 kgf/cm$^2$ | 95 kgf/cm$^2$ | 64 kgf/cm$^2$ |
| Failure form | Wood broken | Wood broken | In impregnated sheet | Between wood |

Industrial Applicability

Since the wood reinforcing material of this invention is formed by disposing a phenol resin-impregnated sheet with a degree of cure of 70% or more and 95% or less on the surface of the carbon fiber-reinforced thermosetting resin sheet, it can solve the problem of wastes caused by release paper resulted in existent carbon fiber prepregs and has excellent bondability to wood materials.

Since the reinforced wood manufactured by using the wood reinforcing material of this invention has high strength, particularly, high strength in a bending failure test and high adhesion and rigidity, and has sufficient water proofness, corrosion resistance, fire proofness, heat resistance and long time stability, wood materials and bonded materials reduced in the weight and increased in the size can be manufactured efficiently.

The reinforced wood material (reinforced single wood material and bonded wood material) of this invention are applicable to application uses in which they are used as usual wood materials and bonded wood materials and, in particular, they are suitable as aggregates for large buildings such as schools, gymnasiums, assembly houses, various kinds of indoor ball game stadia and domes, three or more storied residences and aggregates for wooden bridges.

The reinforced wood material of this invention can reduce the fluctuation of adhesion performance, strength and rigidity caused by scatterings present in wood materials as natural products.

What is claimed is:

1. A wood reinforcing material, comprising:

a carbon fiber-reinforced thermosetting resin sheet; and a phenol resin-impregnated sheet arranged on a surface of said carbon fiber-reinforced thermosetting resin sheet, said phenol resin-impregnated sheet being formed by impregnating a porous sheet with a phenolic resin having a degree of cure of from 70% to 95% according to Soxhlet extraction.

2. A wood reinforcing material as claimed in claim 1, wherein the degree of cure of said phenol resin-impregnated sheet is from 75% to 90%.

3. A wood reinforcing material as claimed in claim 1, wherein the thickness of said phenol resin-impregnated sheet is from 0.01 mm to 1.0 mm.

4. A wood reinforcing material as claimed in claim 1, wherein a matrix resin of said carbon fiber-reinforced ther mosetting resin sheet is cured and bonded and integrated with said phenol resin-impregnated sheet.

5. A wood reinforcing material as claimed in claim 1, wherein a matrix resin of said carbon fiber-reinforced thermosetting resin sheet is a phenol resin.

6. A reinforced wood material in which the wood reinforcing material as claimed in claim 1 is integrated and cured on the surface of a material to be reinforced by way of said phenol resin-impregnated sheet.

7. A reinforced wood material as claimed in claim 6, wherein the wood material to be reinforced is a single wood material or a bonded wood material.

\* \* \* \* \*